United States Patent
Yamamoto et al.

(10) Patent No.: US 6,549,545 B1
(45) Date of Patent: Apr. 15, 2003

(54) PILOT SIGNAL DETECTION METHOD AND RECEIVER

(75) Inventors: Katsuya Yamamoto, Tokyo (JP); Nobuhiko Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/272,350

(22) Filed: Mar. 19, 1999

(30) Foreign Application Priority Data

Mar. 30, 1998 (JP) ............................................. 10-084246

(51) Int. Cl.[7] .................................................. H04J 3/06
(52) U.S. Cl. ........................... 370/508; 375/342; 455/10
(58) Field of Search ................................. 370/335, 342, 370/320, 500, 479, 491, 508; 455/456, 226.4, 10; 375/147, 342, 239, 340, 347, 350, 150; 342/450

(56) References Cited

U.S. PATENT DOCUMENTS

| | | | | | |
|---|---|---|---|---|---|
| 5,745,521 | A | * | 4/1998 | Sugita | 370/342 |
| 5,977,822 | A | * | 11/1999 | Rybicki et al. | 375/239 |
| 5,991,279 | A | * | 11/1999 | Haugli et al. | 370/342 |
| 6,154,487 | A | * | 11/2000 | Murai et al. | 375/150 |
| 6,266,014 | B1 | * | 7/2001 | Fattouche et al. | 455/456 |

* cited by examiner

Primary Examiner—Steven Nguyen
Assistant Examiner—Phuongchau Ba Nguyen
(74) Attorney, Agent, or Firm—Jay H. Maioli

(57) ABSTRACT

A pilot signal detection method and a receiver, in which a search window having a predetermined time width is generated at every substantially constant time interval, and pilot signals existing in search window thus generated are detected. The position of the search window of each period is set in accordance with the delay amount between the timing (T_ref) of the first pilot signal and the timing (T_last) of the last pilot signal detected in the immediately preceding search window.

4 Claims, 4 Drawing Sheets

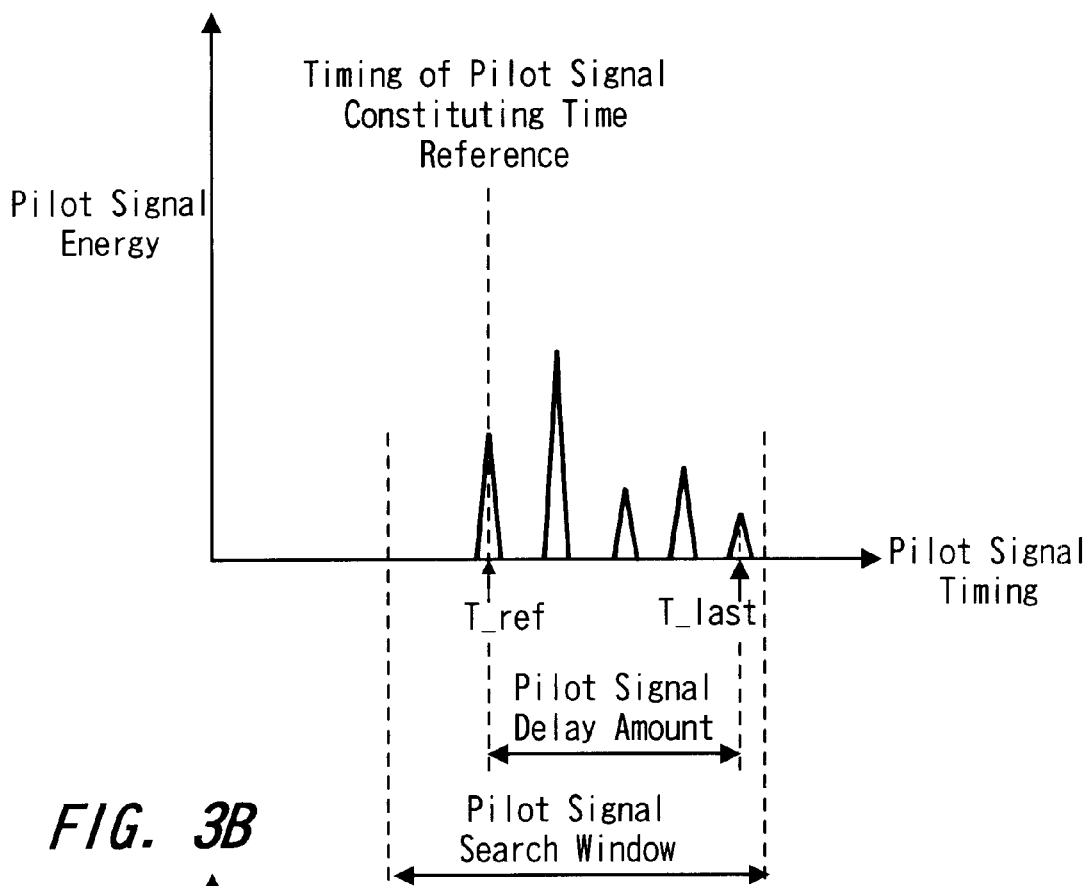
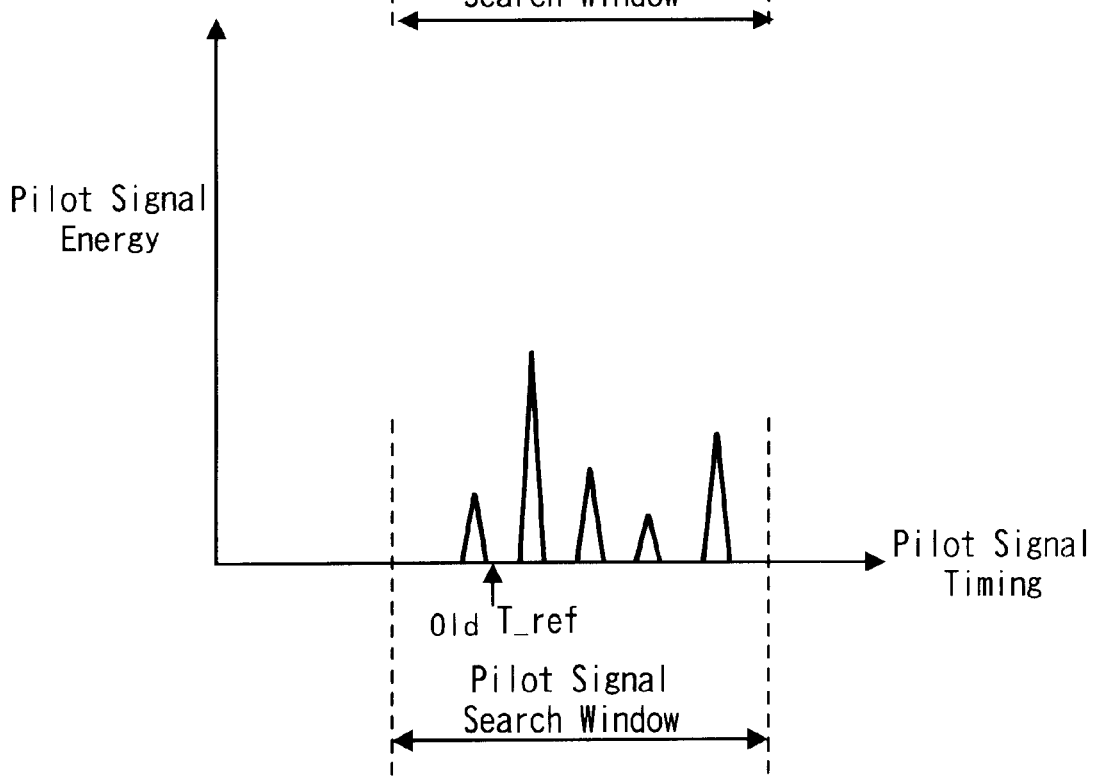

PILOT SIGNAL DETECTION METHOD AND RECEIVER

BACKGROUND OF THE INVENTION

1. Field of the Invention

The present invention relates to a pilot signal detection method and a receiver, or more particularly, to a pilot signal detection method suitably used for a communication scheme called a CDMA (code division multiple access) (hereinafter referred to as the CDMA scheme) and a receiver for detecting the pilot signal.

2. Description of the Related Art

In a communication system with a single base station shared by a plurality of mobile stations, various conventional communication schemes including the frequency division multiple access, the time division multiple access, the code division multiple access and so on have been used in order to avoid the interference of the channels of communication with the mobile stations. Each scheme has its advantages and disadvantages, and an actual communication scheme is selected in accordance with the object of the communication system involved.

In the code division multiple access (hereinafter called the CDMA) scheme, for example, the modulation wave of the same carrier frequency is spread over a wider band than the original frequency band (hereinafter referred to as the spectrum spread) using the PN (pseudo random noise sequence) code which is a specific code assigned to each channel while at the same time multiplexing and transmitting each modulation wave subjected to the spectrum spread. Also, the spectrum spread signal received is synchronized with the PN code supplied through the channel to be demodulated thereby to identify the desired channel.

Specifically, at the transmitting end, a different PN code is assigned to a different channel. The PN code is a pseudo random sequence code. Each modulation wave transmitted through each channel is multiplied by a different PN code and subjected to the spectrum spread at the transmitting end. Each modulation wave is modulated in a predetermined process before being subjected to the spectrum spread. In this way, each modulation wave subjected to the spectrum spread is multiplexed and transmitted.

At the receiving end, on the other hand, the receiving signal transmitted from the transmitting end is multiplied while being synchronized by the same PN code as assigned to the channel to be demodulated. In this way, only the modulation wave transmitted through an intended channel is demodulated.

As described above, in the CDMA scheme, once the same code is set at the transmitting and receiving ends, the direct communication can be established for each call. According to the CDMA scheme, the modulation wave is subjected to the spectrum spread using a different PN code for each channel. At the receiving end, therefore, only the spectrum spread signal transmitted through the channel to be demodulated can be demodulated. Further, this scheme has a high confidentiality due to the fact that the PN code is a pseudo random sequence.

In a mobile communication system using the CDMA scheme, the base station at the transmitting end repeatedly transmits a PN code (hereinafter called the pilot signal) for securing and maintaining the synchronization with a mobile station and reproducing the clock. The mobile station at the receiving end detects each pilot signal transmitted by a plurality of base stations and assigns the detected timing to the demodulators. The PN code is generated in the demodulator of the mobile station. The demodulator multiplies the PN signal by the spectrum spread signal transmitted from the intended base station at the assigned timing and thus demodulates the signal.

Specifically, in the mobile communication system using the CDMA scheme, each base station transmits the PN signal of a different timing as a pilot signal. The mobile station detects the timing of the pilot signal supplied from an intended base station, and synchronizes the PN code generated in the demodulator with this timing, thus correctly demodulating only the spectrum spread signal transmitted from the intended base station.

It has been described above that each base station transmits the PN code at a different timing. Nevertheless, the PN codes themselves have the same code pattern. In other words, the difference in timing of the pilot signal for each base station represents the difference between the PN codes as it is.

The mobile station may move while communicating with a base station. Therefore, the environment in which the received wave propagates changes every moment. Specifically, since obstacles such as buildings and so on exist between the base station and the mobile station and far mountains reflect the radio wave, the radio wave received by the mobile station is always a combination of a plurality of reflected waves. Further, the mobile station itself moves at different speeds. Therefore, the timing at which the pilot signal is detected at the mobile station changes every moment, and a phenomenon called the fading occurs, thereby making it sometimes impossible to detect the pilot signal. In order to continue detecting the pilot signal correctly in the fading environment, a radio telephone system using the CDMA communication scheme as the communication scheme is so configured that the first pilot signal received by the mobile station is set at the center of a pilot signal search window as a time reference.

Specifically, under the state that the pilot signal search window is set as shown in FIG. 1A, a detection timing $T\_ref$ of the first pilot signal in the window is set as a reference timing for determining the next pilot signal detection period. More specifically, as shown in FIG. 1B, the timing (referred to as the Old $T\_ref$) after the lapse of a predetermined period of time from the first detection timing $T\_ref$ to the time point when the next pilot signal is transmitted is set at the center of the pilot signal search window, within which the pilot signals are detected. The detection timing $T\_ref$ of the first pilot signal in the window constitutes a new timing $T\_ref$ providing a reference for setting the next window.

In this process of detecting the pilot signals in the window set as described above, however, all the pilot signals transmitted do not enter the search window depending on the prevailing signal conditions. As shown in FIG. 1B, for example, some pilot signals may exist outside the window and fail to be detected. Especially, in the fading environment where the arrival timing of the pilot signals considerably changes or in an environment where the arrival timing of the pilot signals is considerably delayed, the probability of the failure to detect the pilot signals increases.

A method conceivable for preventing this inconvenience is to reduce the probability of failure to detect the pilot signal by setting a wider search window. Such a method, however, consumes a considerable period of time for detecting the pilot signals and the power required for the detection is undesirably increased.

SUMMARY OF THE INVENTION

Accordingly, an object of the present invention is to provide a pilot signal detection method and a receiver which can detect the pilot signals in simplistic and accurate fashion.

In order to achieve the object described above, according to the present invention, there is provided a pilot signal detection method for receiving a spectrum spread signal and detecting an arbitrary pilot signal from the spectrum spread signal thus received, including the steps of generating a search window of a predetermined time width for each substantially predetermined period of time and detecting pilot signals existing in the window thus generated, and setting the current window at a position corresponding to the distribution of the pilot signals detected in an immediately preceding window.

According to the invention, even in the case where the delay amount of a pilot signal transmitted is considerably large, the particular pilot signal having a large delay amount is highly liable to exist in the window set for each period.

BRIEF DESCRIPTION OF THE DRAWINGS

FIGS. 3A and 3B are each a diagram showing the timings of the pilot signals in an example of the pilot signal detection process according to an embodiment of the invention.

DESCRIPTION OF THE PREFERRED EMBODIMENT

Figure 2:
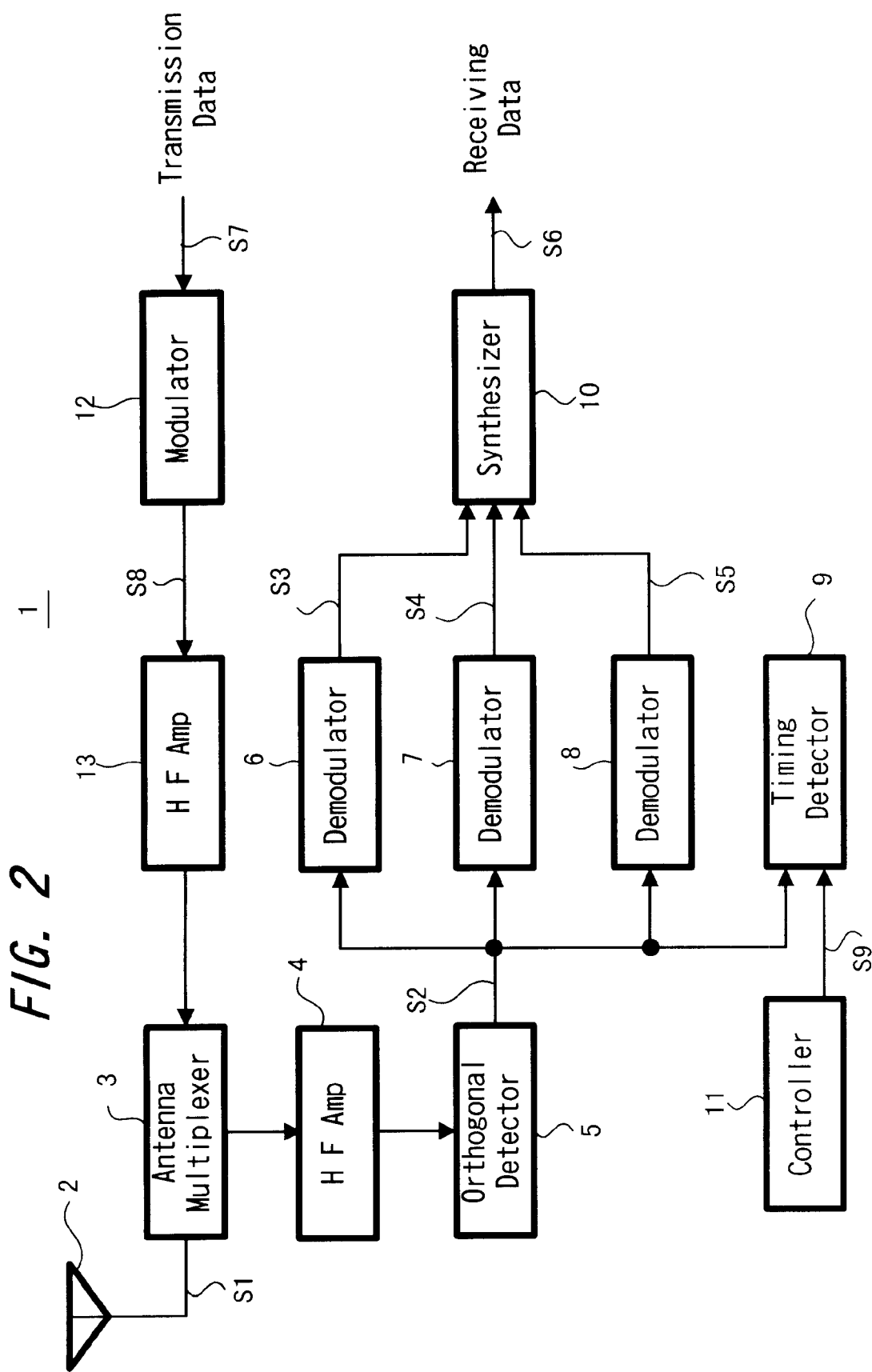
FIG. 2 is a block diagram showing an example configuration of a mobile station according to an embodiment of the invention.
Figure 4:
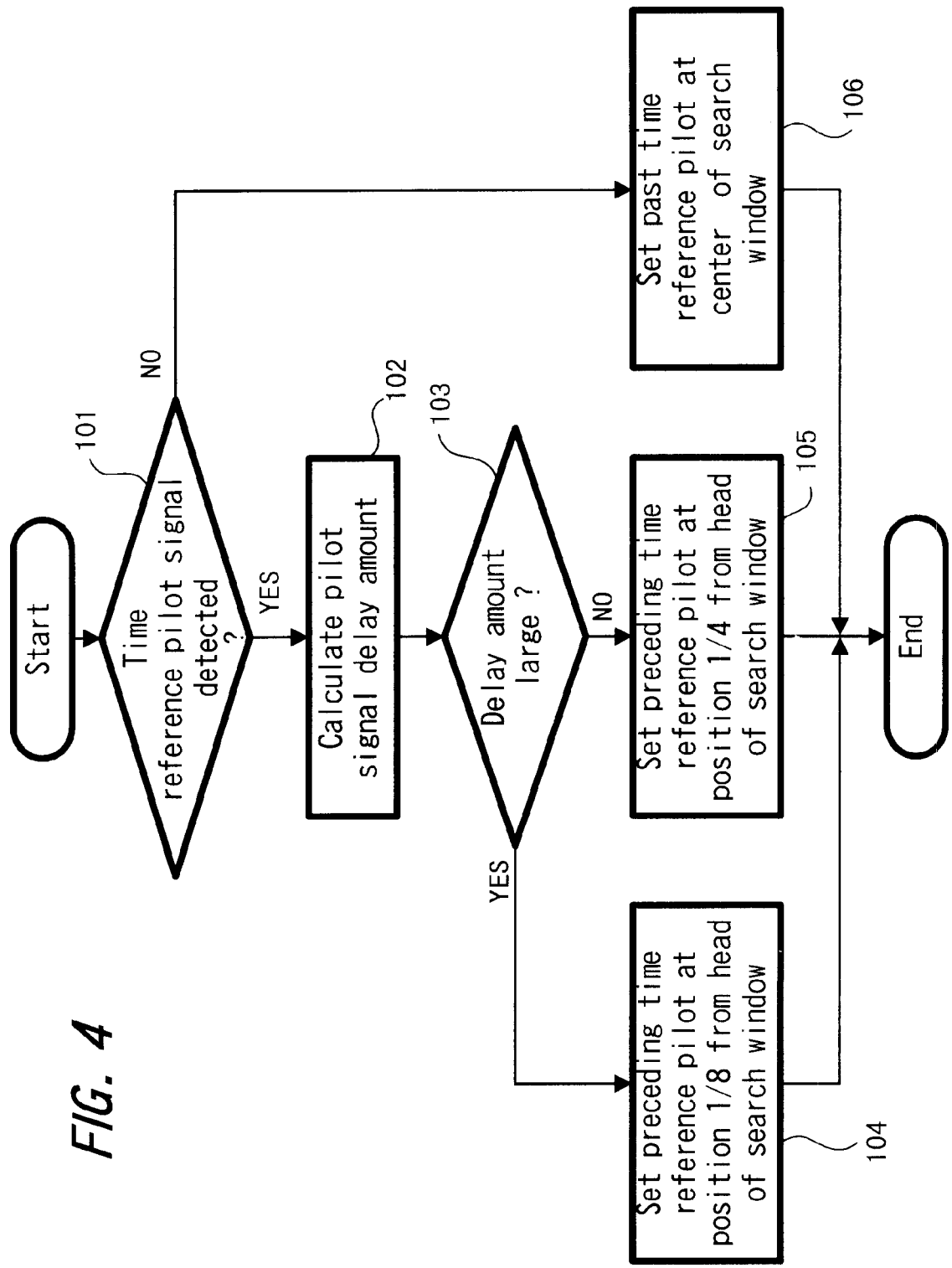
FIG. 4 is a flowchart showing an example of the procedure for setting a pilot signal search window according to an embodiment of the invention.

An embodiment of the invention will be explained below with reference to FIGS. 2 to 4.

This embodiment represents a case in which a terminal unit constituting a mobile station communicates with an arbitrary base station (with which the mobile station can best communicate) with spectrum spread signals transmitted by radio from a plurality of base stations according to the CDMA scheme. FIG. 2 is a diagram showing a configuration of the terminal unit according to this embodiment. A terminal unit 1 includes a transmitting/receiving antenna 2 which is connected through an antenna multiplexer 3 to the transmission and receiving circuits.

The receiving circuit supplies a signal S1 received at the antenna 2 to a high-frequency amplifier 4 through the antenna multiplexer 3 and amplifies the same. The output amplified at the high-frequency amplifier 4 is supplied to an orthogonal detection circuit 5 for orthogonal detection and conversion process into a baseband signal. This baseband signal is converted into a digital signal in the orthogonal detection circuit 5. A digital baseband signal S2 output from the orthogonal detection circuit 5 is supplied to a plurality of (three, in this case) demodulators 6, 7, 8 and a timing detector 9.

The timing detector 9 is a circuit for detecting the pilot signal transmitted by a base station from the baseband signal S2. The timing of detecting the pilot signal is controlled by a control signal S9 from a controller 11 for controlling the communication by the terminal unit 1. This control process and the detection process by the detector 9 will be described later on.

Each of the demodulators 6, 7, 8 is supplied with timing information based on the pilot signals detected by the timing detector 9. The demodulators 6, 7, 8 each demodulate the baseband signal S2 at a timing designated by the timing information, and demodulation signals S3, S4, S5 thus produced are supplied to a synthesizer 10. A PN code is generated in the demodulation process at each of the demodulators 6, 7, 8 and multiplied by the baseband signal S2 at a timing designated in the timing information for demodulation. At each base station, the timing of the PN code contained in the transmission signal is set to a timing unique to each base station. The PN code of each demodulator is synchronized with the timing indicated by the pilot signal and the baseband signal S2 is demodulated by use of the synchronized PN code thereby to selectively demodulate only the signal transmitted from a base station transmitting a signal to be demodulated.

The synthesizer 10 synthesizes the demodulation signals S3, S4 and S5 produced from the signals received through a multipath constituting a plurality of transmission paths. In the process, since the demodulation signals S3, S4, S5 are respectively demodulated at different timings, after the respective demodulation signals S3, S4, S5 are synchronized in timing, they are synthesized. The synthesis at the synthesizer 10 makes it possible to generate a receiving data S6 having a high signal-to-noise ratio and antijamming rate. The receiving data S6 synthesized at this synthesizer 10 is supplied to a receiving data processing circuit (not shown) in the subsequent stage.

The transmission circuit supplies a transmission data S7 generated in a transmission data generating circuit (not shown) to a modulator 12. The modulator 12 generates a modulation signal S8 by performing the spectrum spread and the offset QPSK (quaternary phase shift modulating), for example, to the transmission data S7. The modulation signal S8 thus generated, after being amplified at a high-frequency amplifier 13, is supplied to the antenna 2 through the antenna multiplexer 3 and transmitted by radio.

Now, the process in which the timing detector 9 detects the pilot signal under the control of the controller 11 at the time of receiving operation will be explained with reference to FIGS. 3 and 4. For detecting the pilot signal at the timing detector 9, a pilot signal search window of a predetermined time width is set periodically at a substantially predetermined time interval, so that the pilot signals contained in the receiving signals in the search window thus set is detected. In this case, the search window is set at a position determined under the control of the controller 11.

FIG. 3 is a diagram showing an example of setting the search window in the timing detector 9 according to this embodiment. Assume that a pilot signal is detected from the receiving signal (baseband signal S2) in the state of FIG. 3A from the search window set at a given timing. The controller 11 evaluates the radio wave propagation state from the detected state in the search window. For example, a detection timing T_ref of the pilot signal detected at first in the search window and a detection timing T_last of the pilot signal detected at last in the same search window are determined by the controller 11, and the radio wave propagation state is evaluated from the delay amount (time lag) between the timings T_ref and T_last. The relation between the delay amount and the evaluation of the radio wave propagation state is such that in the case where the delay amount is considerably large, for example, it is determined that a fading environment prevails in which the timing of arrival of the pilot signals undergoes a considerable change or an environment in which the arrival timing of the pilot signals is delayed considerably. In accordance with the environment thus determined, the controller 11 performs such a control that the position of the search window set by the timing detector 9 at the next timing is corrected.

Under the control of the controller 11, the search window is set in such a position that when pilot signals are detected and the delay amount thereof is determined as shown in FIG. 3A, the next search window is set as shown in FIG. 3B. As seen from this diagram, the timing (Old T_ref) one period behind the detected timing T_ref of the pilot signal providing a time reference (the first pilot signal detected is used as a time reference) in the search window is set in the first half from the center of the window to be searched.

Figure 1A:
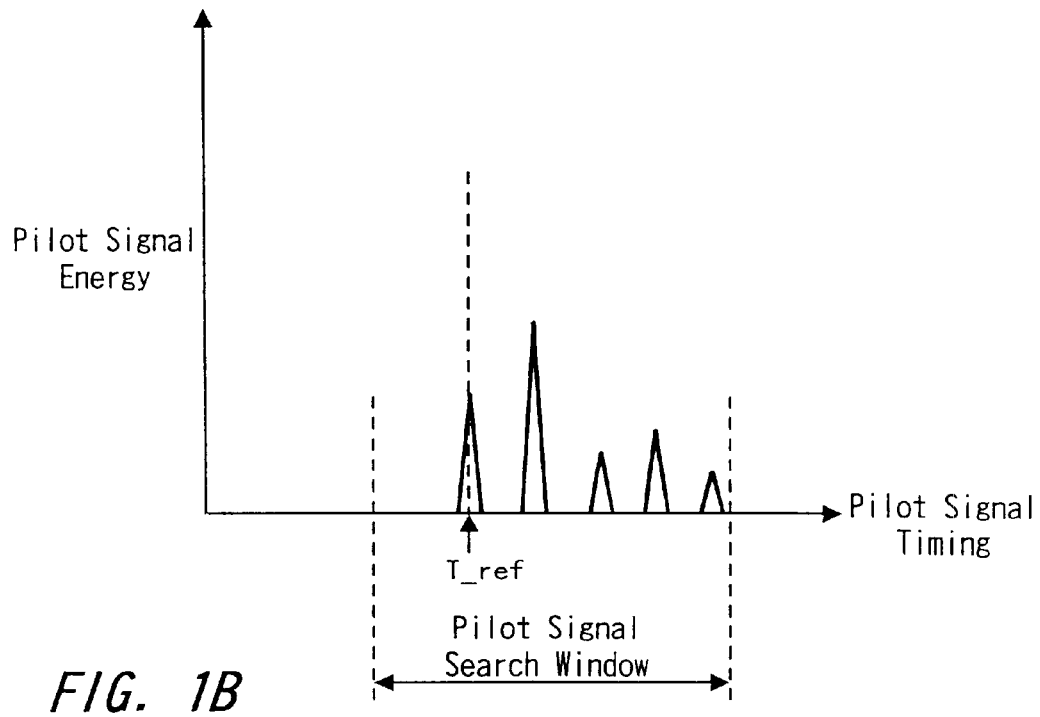
FIGS. 1A and 1B are each a diagram showing the timings of the pilot signals in an example of the conventional pilot signal detection process.
Figure 1B:
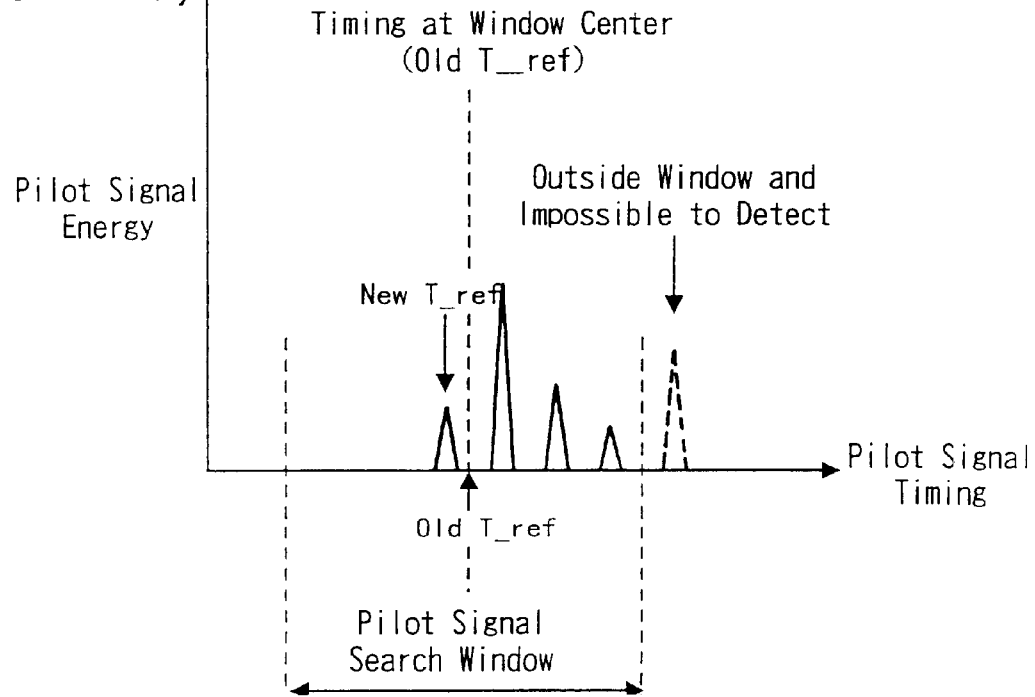

Assume, for example, that the time width of the search window is 1 and that it is determined that the delay amount is larger than a predetermined threshold value. The search window is set in such a manner that the reference timing (Old T_ref) is located at a position about one eighth from the head of the search window. Also, in the case where it is determined that the delay amount is not more than the predetermined threshold value, the search window is set in such a manner that the reference timing (Old T_ref) comes at a position about one fourth from the head of the search window (the state shown in FIG. 3B, for example). Also, in the case where any pilot signal cannot be detected in the immediately preceding search window, the timing delayed by an integral multiple of the period of one cycle for pilot signal transmission from the reference timing of the pilot signal previously detected is set at the substantial center of the search window. The timing providing the reference is set at the substantial center of the search window in the same manner as in the prior art shown in FIG. 1B.

Based on the pilot signals detected in the search window thus set by the timing detector 9, the timing is set for multiplying the PN code in each of the demodulators 6, 7, 8, thereby demodulating the receiving signal according to the CDMA scheme.

Now, an example of the process for setting a pilot signal search window by the timing detector 9 under the control of the controller 11 will be explained with reference to the flowchart of FIG. 4. First, it is determined whether or not a pilot signal is detected in the immediately preceding search window (step 101). Since the pilot signal, which is undergoing a change each moment, cannot always be detected each time.

In the case where a pilot signal is detected in the immediately preceding search window, the delay profile of the particular search window is evaluated (step 102). Specifically, the time difference (delay amount) between the earliest detection timing T_ref and the last detection timing T_last in the search window is determined and evaluated. Then, it is determined from the evaluated state whether or not a fading environment is involved with the arrival timing of the pilot signal changing considerably or an environment is involved with the arrival timing of the pilot signal considerably delayed (step 103). Specific means of determining the delay amount determine whether or not the delay amount exceeds a threshold value.

In the case where it is determined that the delay amount exceeds the threshold level, the timing (Old T_ref) one period behind the preceding time reference pilot signal timing (T_ref) is set at a position about one eighth from the head of the search window (step 104). In the case where it is determined in step 103 that the delay amount does not exceed the threshold level, on the other hand, the timing (Old T_ref) one period behind the preceding time reference pilot signal timing (T_ref) is set at a position about one fourth from the head of the search window (step 105). Further, in the case where any pilot signal cannot be detected in the immediately preceding search window in step 101, the timing (Old T_ref) a predetermined period behind the time reference pilot signal timing (T_ref) previously detected is set at the substantial center of the search window.

As described above, with the terminal unit according to this embodiment, the delay state of the pilot signals is evaluated to determine the pilot signal time reference, and the position of the time reference in the pilot signal search window is corrected by being variably set based on the evaluation. In this way, the pilot signals are detected in the search window. Even in a fading environment where the arrival timing of the pilot signal is considerably changed or in an environment where the arrival timing of the pilot signal is considerably delayed, the probability of failure to detect a pilot signal can be suppressed low and the communication with the base station can be maintained in satisfactory conditions. Specifically, in the case where the detected delay amount is considerably large, the position of time reference is set at a position considerably earlier than the center in the search window so that all the pilot signals considerably delayed may be detected in the window. In the case where the delay amount is small, on the other hand, the position of time reference is set at a position slightly earlier than the center in the search window. In this way, a proper window position corresponding to the pilot signal having a small delay amount is set, thereby making it possible to detect the pilot signal under satisfactory conditions. Thus, the pilot signal can be detected successfully without widening the time width of the search window. Also, in the case where the pilot signal cannot be detected in the immediately preceding search window, the window is set with the previous time reference position as a center. Therefore, it is possible to detect the pilot signal in satisfactory fashion regardless of the position of the next pilot signal.

In the embodiment described above, the setting position of search window is changed in three positions depending on the prevailing situation. As an alternative, the search window can be set more finely in a greater number of different positions. As another alternative, the search window can be set in either of two positions (with the timer reference at positions one eighth and one fourth from the center, for example). As still another alternative, the timing providing a time reference can be fixedly set at a position ahead of the center of the search window (at a position one fourth ahead of the center, for example). Even in the case where the reference timing is fixedly set at a position ahead of the search window center, the possibility of the failure to detect a pilot signal is reduced as compared with that for the prior art.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A pilot signal detection method for receiving a spectrum spread signal and detecting an arbitrary pilot signal from the spectrum spread signal thus received, comprising the steps of:

generating a search window of a predetermined time width at every substantially constant period of time and detecting a pilot signal existing in the search window thus generated; and setting a position of a current search window corresponding to a distribution of pilot signals detected in an immediately preceding search window, wherein a delay amount between a first pilot signal and a last pilot signal detected in the immediately preceding search window is detected and, in accordance with the detected delay amount, the position of said current search window is set.

2. A pilot signal detection method according to claim 1, wherein, in a case where a pilot signal constituting a reference cannot be detected in the immediately preceding search window, a first search window position is set in which a center of the search window is delayed by an integral multiple of a predetermined period after a time at which a pilot signal is detected previously;

in a case where a delay amount of the pilot signal detected in the immediately preceding search window is less than a predetermined amount, a second search window position is set before said first search window position; and in a case where the delay amount of the pilot signal detected in the immediately preceding search window is more than a predetermined amount, a third search window position is set before said second search window position.

3. A receiver for receiving a spectrum spread signal and detecting an arbitrary pilot signal from said spectrum spread signal, comprising:

search window setting means for generating a search window of a predetermined time width periodically at a substantially constant time interval;

pilot signal detection means for detecting the pilot signal existing in a receiving signal in the search window generated by said search window setting means;

search window position correction means for setting a window position generated by said search window setting means, in accordance with a distribution of pilot signals detected in an immediately preceding search window; and delay amount detection means for detecting a delay amount between the first and the last pilot signals detected in an immediately preceding search window by said pilot signal detection means, wherein a search window position corrected by said search window position correction means is set in accordance with the delay amount detected by said delay amount detection means.

4. A receiver according to claim 3, wherein said search window position correction means corrects and sets the search window position in such a manner that:

in a case where the pilot signal constituting a reference cannot be detected in the immediately preceding search window, a first search window position is set in which a center of the search window is delayed by an integral multiple of a predetermined period after a time at which a pilot signal is detected previously;

in a case where a delay amount of the pilot signal detected in the immediately preceding search window is less than a predetermined amount, a second search window position is set before said first search window position; and in a case where the delay amount of the pilot signal detected in the immediately preceding search window is more than a predetermined amount, a third search window position is set before said second search window position.

* * * * *